United States Patent
Nishimoto et al.

(10) Patent No.: US 8,128,225 B2
(45) Date of Patent: Mar. 6, 2012

(54) OPTICAL ARTICLE AND PROCESS FOR PRODUCING THE SAME

(75) Inventors: Keiji Nishimoto, Ina (JP); Takashi Noguchi, Shiojiri (JP); Hiroyuki Seki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/710,701

(22) Filed: Feb. 23, 2010

(65) Prior Publication Data

US 2010/0225882 A1     Sep. 9, 2010

(30) Foreign Application Priority Data

Mar. 4, 2009  (JP) .................... 2009-050325
Aug. 31, 2009  (JP) .................... 2009-199467

(51) Int. Cl.
  *G02C 7/10*  (2006.01)
  *G02C 7/02*  (2006.01)
  *B32B 17/06*  (2006.01)
  *B05D 5/06*  (2006.01)

(52) U.S. Cl. ......... 351/163; 351/177; 428/426; 427/165

(58) Field of Classification Search ......... 351/163–166, 351/177, 159; 428/411.1, 412, 426; 427/164–166
See application file for complete search history.

(56) References Cited

U.S. PATENT DOCUMENTS

| 5,619,596 | A  | * | 4/1997 | Iwaki et al. | .................... 382/278 |
| 7,079,323 | B2 | * | 7/2006 | Ohta et al. | .................... 359/642 |
| 2006/0251884 | A1 | * | 11/2006 | Naito et al. | .................... 428/331 |
| 2007/0159697 | A1 | * | 7/2007 | Terayama | .................... 359/586 |

FOREIGN PATENT DOCUMENTS

| JP | 06-313802 A | 11/1994 |
| JP | 2001-233611 A | 8/2001 |
| JP | 2004-341052 A | 12/2004 |
| JP | 2005-301208 A | 10/2005 |
| JP | 2006-126782 A | 5/2006 |
| JP | 2007-212948 A | 8/2007 |

* cited by examiner

*Primary Examiner* — Dawayne A Pinkney
(74) *Attorney, Agent, or Firm* — DLA Piper LLP (US)

(57) ABSTRACT

A process for producing an optical article having an antireflection layer formed directly or via another layer on an optical base material, includes: forming a primary layer contained in the antireflection layer; and forming a light transmissive conductive layer containing a metal containing germanium as a main component and/or a compound of germanium and a transition metal on a surface of the primary layer.

15 Claims, 10 Drawing Sheets

| FROM BASE MATERIAL SIDE | FILM MATERIAL | PHYSICAL FILM THICKNESS (nm) | DEPOSITION RATE (nm/sec) | DEPOSITION TIME (sec) |
|---|---|---|---|---|
| 1st LAYER | $SiO_2$ | 43.66 | 2.0 | 22 |
| 2nd LAYER | $TiO_2$ | 11 | 0.2 | 55 |
| 3rd LAYER | $SiO_2$ | 57.02 | 2.0 | 29 |
| 4th LAYER | $TiO_2$ | 36.23 | 0.2 | 181 |
| 5th LAYER | $SiO_2$ | 24.74 | 2.0 | 12 |
| 6th LAYER | $TiO_2$ | 36.23 | 0.2 | 181 |
| 7th LAYER | Ge OR Ge COMPOUND LAYER | - | 0.1 | - |
| 8th LAYER | $SiO_2$ | 101 | 2.0 | 51 |

FIG. 3

| EXAMPLE OR COMPARATIVE EXAMPLE | SAMPLE | LENS BASE MATERIAL | HC | ANTIREFLECTION LAYER (nm) | | | | ANTI-FOULING LAYER | FILM FORMING CONDITIONS FOR CONDUCTIVE LAYER | EVALUATION RESULTS | |
|---|---|---|---|---|---|---|---|---|---|---|---|
| | | | | 6th LAYER TiO$_2$ | 7th LAYER CONDUCTIVE LAYER | | 8th LAYER SiO$_2$ | | | SHEET RESISTANCE (Ω/□) | TRANSPARENCY |
| EXAMPLE 1 | S1 | PLASTIC LENS | WITH | 36.23 | METAL Ge | | 101 | WITH | DEPOSITION, Ge (0.1 nm/sec × 40 sec), WITHOUT ION-ASSISTED DEPOSITION | $2 \times 10^{10}$ | LIGHT BROWN |
| EXAMPLE 2 | S2 | WHITE PLATE GLASS | WITHOUT | 36.23 | METAL Ge | | 101 | WITH | DEPOSITION, Ge (0.1 nm/sec × 40 sec), WITHOUT ION-ASSISTED DEPOSITION | $2 \times 10^{10}$ | LIGHT BROWN |
| EXAMPLE 3 | S3 | PLASTIC LENS | WITH | 36.23 | TiGe | | 101 | WITH | DEPOSITION, Ge (0.1 nm/sec × 10 sec), WITH ION-ASSISTED DEPOSITION (GAS SPECIES: Ar, VOLTAGE: 500 eV, CURRENT: 150 mA) | $5 \times 10^{10}$ | TRANSPARENT |
| EXAMPLE 4 | S4 | WHITE PLATE GLASS | WITHOUT | 36.23 | TiGe | | 101 | WITH | DEPOSITION, Ge (0.1 nm/sec × 10 sec), WITH ION-ASSISTED DEPOSITION (GAS SPECIES: Ar, VOLTAGE: 500 eV, CURRENT: 150 mA) | $4 \times 10^{11}$ | TRANSPARENT |
| EXAMPLE 5 | S5 | PLASTIC LENS | WITH | 36.23 | TiGe | | 101 | WITH | DEPOSITION, Ge (0.1 nm/sec × 10 sec), WITH ION-ASSISTED DEPOSITION (GAS SPECIES: Ar, VOLTAGE: 800 eV, CURRENT: 150 mA) | $5 \times 10^{9}$ | TRANSPARENT |
| EXAMPLE 6 | S6 | WHITE PLATE GLASS | WITHOUT | 36.23 | TiGe | | 101 | WITH | DEPOSITION, Ge (0.1 nm/sec × 10 sec), WITH ION-ASSISTED DEPOSITION (GAS SPECIES: Ar, VOLTAGE: 800 eV, CURRENT: 150 mA) | $1 \times 10^{10}$ | TRANSPARENT |
| COMPARATIVE EXAMPLE 1 | R1 | PLASTIC LENS | WITH | 25.7 | ITO | | 99.5 | WITH | DEPOSITION, ITO (0.1 nm/sec, 2.5 nm), WITH ION-ASSISTED DEPOSITION (GAS SPECIES: O$_2$, VOLTAGE: 500 eV, CURRENT: 250 mA) | $2 \times 10^{13}$ | TRANSPARENT |
| COMPARATIVE EXAMPLE 2 | R2 | PLASTIC LENS | WITH | 36 | WITHOUT | | 101 | WITH | NA | $5 \times 10^{13}$ | TRANSPARENT |
| COMPARATIVE EXAMPLE 3 | R3 | WHITE PLATE GLASS | WITHOUT | 36 | WITHOUT | | 101 | WITH | NA | $5 \times 10^{13}$ | TRANSPARENT |

PLASTIC LENS: SEIKO SUPER SOVEREIGN (MANUFACTURED BY SEIKO EPSON CORPORATION), WHITE PLATE GLASS: B270, HC: HARD COAT LAYER, NA: NOT APPLIED

| FROM BASE MATERIAL SIDE | FILM MATERIAL | PHYSICAL FILM THICKNESS (nm) | DEPOSITION RATE (nm/sec) | DEPOSITION TIME (sec) |
|---|---|---|---|---|
| 1st LAYER | SiO$_2$ | 27.69 | 2.0 | 14 |
| 2nd LAYER | ZrO$_2$ | 8 | 0.4 | 20 |
| 3rd LAYER | SiO$_2$ | 207.85 | 2.0 | 104 |
| 4th LAYER | ZrO$_2$ | 34.81 | 0.4 | 87 |
| 5th LAYER | Ge OR Ge COMPOUND LAYER | - | - | - |
| 6th LAYER | SiO$_2$ | 20.72 | 2.0 | 10 |
| 7th LAYER | ZrO$_2$ | 56.5 | 0.4 | 141 |
| 8th LAYER | SiO$_2$ | 94.74 | 2.0 | 47 |

| EXAMPLE OR COMPARATIVE EXAMPLE | SAMPLE | LENS BASE MATERIAL | HC | ANTIREFLECTION LAYER (nm) | | | | ANTI-FOULING LAYER | FILM FORMING CONDITIONS FOR CONDUCTIVE LAYER | EVALUATION RESULTS | |
|---|---|---|---|---|---|---|---|---|---|---|---|
| | | | | 4th LAYER ZrO₂ | 5th LAYER CONDUCTIVE LAYER | 5th LAYER | 6th LAYER SiO₂ | | | SHEET RESISTANCE (Ω/□) | ABSORPTION LOSS (%) |
| EXAMPLE 7 | S7 | PLASTIC LENS | WITH | 34.81 | TiGe | | 20.72 | WITH | UNDERLYING LAYER: DEPOSITION OF TiOx (2 nm) DEPOSITION, Ge (0.125 nm/sec × 12 sec), WITH ION-ASSISTED DEPOSITION, (GAS SPECIES: Ar, VOLTAGE: 1000 eV, CURRENT: 150 mA) | $3 \times 10^9$ | NA |
| EXAMPLE 8 | S8 | WHITE PLATE GLASS | WITHOUT | 34.81 | TiGe | | 20.72 | WITH | DEPOSITION, Ge (0.125 nm/sec × 12 sec), WITH ION-ASSISTED DEPOSITION, (GAS SPECIES: Ar, VOLTAGE: 1000 eV, CURRENT: 150 mA) | $5 \times 10^9$ | COLORED BROWN |
| EXAMPLE 9 | S9 | PLASTIC LENS | WITH | 34.81 | TiGe | | 20.72 | WITH | UNDERLYING LAYER: DEPOSITION OF TiOx (1 nm) DEPOSITION, Ge (0.0625 nm/sec × 8 sec), WITH ION-ASSISTED DEPOSITION, (GAS SPECIES: Ar, VOLTAGE: 600 eV, CURRENT: 150 mA) | $5 \times 10^9$ | NA |
| EXAMPLE 10 | S10 | WHITE PLATE GLASS | WITHOUT | 34.81 | TiGe | | 20.72 | WITH | UNDERLYING LAYER: DEPOSITION OF TiOx (1 nm) DEPOSITION, Ge (0.0625 nm/sec × 8 sec), WITH ION-ASSISTED DEPOSITION, (GAS SPECIES: Ar, VOLTAGE: 600 eV, CURRENT: 150 mA) | $1 \times 10^{10}$ | 1.3 |
| EXAMPLE 11 | S11 | PLASTIC LENS | WITH | 34.81 | TiGe | | 20.72 | WITH | UNDERLYING LAYER: DEPOSITION OF TiOx (1 nm) DEPOSITION, Ge (0.025 nm/sec × 8 sec), WITH ION-ASSISTED DEPOSITION, (GAS SPECIES: Ar, VOLTAGE: 600 eV, CURRENT: 150 mA) | $1 \times 10^9$ | NA |
| EXAMPLE 12 | S12 | WHITE PLATE GLASS | WITHOUT | 34.81 | TiGe | | 20.72 | WITH | UNDERLYING LAYER: DEPOSITION OF TiOx (1 nm) DEPOSITION, Ge (0.025 nm/sec × 8 sec), WITH ION-ASSISTED DEPOSITION, (GAS SPECIES: Ar, VOLTAGE: 600 eV, CURRENT: 150 mA) | $3 \times 10^9$ | 1.5 |
| EXAMPLE 13 | S13 | PLASTIC LENS | WITH | 34.81 | METAL Ge | | 20.72 | WITH | DEPOSITION, Ge (0.025 nm/sec × 8 sec), WITHOUT ION-ASSISTED DEPOSITION | $2 \times 10^{13}$ | NA |
| EXAMPLE 14 | S14 | WHITE PLATE GLASS | WITHOUT | 34.81 | METAL Ge | | 20.72 | WITH | DEPOSITION, Ge (0.025 nm/sec × 8 sec), WITHOUT ION-ASSISTED DEPOSITION | $3 \times 10^{13}$ | 0 |
| EXAMPLE 15 | S15 | PLASTIC LENS | WITH | 34.81 | ZrGe | | 20.72 | WITH | DEPOSITION, Ge (0.125 nm/sec × 8 sec), WITH ION-ASSISTED DEPOSITION, (GAS SPECIES: Ar, VOLTAGE: 800 eV, CURRENT: 150 mA) | $2 \times 10^{13}$ * | NA |
| EXAMPLE 16 | S16 | WHITE PLATE GLASS | WITHOUT | 34.81 | ZrGe | | 20.72 | WITH | DEPOSITION, Ge (0.125 nm/sec × 8 sec), WITH ION-ASSISTED DEPOSITION, (GAS SPECIES: Ar, VOLTAGE: 800 eV, CURRENT: 150 mA) | $4 \times 10^{13}$ * | 0 |
| COMPARATIVE EXAMPLE 4 | R4 | WHITE PLATE GLASS | WITHOUT | 34.81 | WITHOUT | | 20.22 | WITH | NA | $5 \times 10^{14}$ | REF |

PLASTIC LENS: SEIKO SUPER SOVEREIGN (MANUFACTURED BY SEIKO EPSON CORPORATION), WHITE PLATE GLASS: B270, HC: HARD COAT LAYER, NA: NOT APPLIED, *: MEASURED IMMEDIATELY AFTER PRODUCTION, REF: REFERENCE

FIG. 8

OPTICAL ARTICLE AND PROCESS FOR PRODUCING THE SAME

BACKGROUND

1. Technical Field

The present invention relates to an optical article to be used for lenses such as spectacle lenses, other optical materials or products, and a process for producing the same.

2. Related Art

In an optical article such as a spectacle lens, on a surface of a base material (optical base material) for fulfilling various functions, layers (films) having various functions are formed for the purpose of further enhancement of the functions of the base material and protection thereof. For example, a hard coat layer for securing the durability of a lens base material, an antireflection layer for preventing ghost and flicker, and the like are known. Typical examples of the antireflection layer include a so-called multilayer antireflection layer obtained by alternately laminating oxide films having different refractive indices on a surface of a lens base material having a hard coat layer laminated thereon.

In JP-A-2004-341052, it is described that a novel optical element having antistatic performance which is favorable for a low heat-resistant base material is provided. It is also described that in the optical element such as a spectacle lens having an antireflection film with a multilayer structure on a plastic optical base material, the antireflection film contains a transparent conductive layer, the transparent conductive layer is formed by ion-assisted vacuum vapor, and the other constituent layers of the antireflection film are formed by electron beam vacuum vapor or the like. It is also described that the conductive layer is formed of an inorganic oxide containing any one of indium, tin, zinc, and the like, or two or more components thereof, and particularly, ITO (indium tin oxide: a mixture of indium oxide and tin oxide) is preferred.

On a film or a layer to be formed on a surface of a base material, a conductive layer with a certain thickness can be formed for imparting electric conductivity so as to prevent static electricity, shield electromagnetic waves or the like. For example, an indium tin oxide (ITO) layer or a metal layer of gold, silver, etc. can be used. However, ITO or silver may pose a problem in terms of resistance or corrosion to an acid, an alkali or the like, and gold generally has low adhesion and film peeling may be caused.

SUMMARY

One aspect of the invention is directed to a process for producing an optical article having an antireflection layer formed directly or via another layer on an optical base material. This production process includes forming a primary layer contained in the antireflection layer and forming a light transmissive conductive layer containing a metal containing germanium as a main component and/or a compound of germanium and a transition metal on a surface of the primary layer. Germanium is a material for a product familiar to the general public or a material used in a semiconductor substrate or the like. Further, the metal containing germanium as a main component and/or the compound of germanium and a transition metal has a low sheet resistance and has electric conductivity. Further, germanium has a lower evaporation temperature at the time of vacuum vapor than silicon which is often used in an antireflection layer and vapor (ion-assisted vapor) thereof can be easily performed. Further, a target material is easily obtained and is chemically stable, and therefore, it is possible to form a film by sputtering or the like.

Accordingly, by incorporating or superimposing a light transmissive conductive layer containing germanium in or on an antireflection layer, an optical article having high antistatic performance can be provided. Further, germanium is less likely to corrode than ITO or silver, has high compatibility with silicon which is often used in an antireflection layer, and is not likely to cause film peeling.

Therefore, according to this production process, it becomes possible to economically provide an optical article having an excellent antistatic effect by decreasing the sheet resistance of an antireflection layer while suppressing the effect on the optical performance of the antireflection layer.

The formation of a conductive layer includes vapor of at least any one of germanium, a transition metal which forms a compound with germanium, and a compound of germanium and a transition metal on the surface of the primary layer.

If the primary layer is a layer containing a transition metal capable of forming a compound with germanium, a conductive layer containing a compound of germanium with the transition metal contained in the primary layer can be formed on the primary layer by driving germanium into the surface of the primary layer by vapor or the like. Further, if the primary layer is a layer containing a transition metal capable of forming a compound with germanium, there is a high possibility that a mechanical and/or chemical difference between the conductive layer containing a transition metal of the same or a similar kind and the primary layer is small, and therefore, an optical article having mechanically and/or chemically more stable antireflection layer and conductive layer is easily produced.

One of the typical examples of the antireflection layer is a multilayer film containing the primary layer. The production process of the aspect of the invention may further include forming another layer of the multilayer film serving as the antireflection layer by superimposing it on the conductive layer.

The production process according to the aspect of the invention may further include forming an antifouling layer directly or via another layer on the primary layer having the conductive layer formed on the surface thereof. The sheet resistance of the optical article can be decreased even if the antifouling layer is formed on the antireflection layer containing the conductive layer or on the conductive layer formed on the antireflection layer.

Another aspect of the invention is directed to an optical article having an optical base material, an antireflection layer formed directly or via another layer on the optical base material, and a light transmissive conductive layer formed on a surface of a primary layer contained in the antireflection layer. The conductive layer contains a metal containing germanium as a main component and/or a compound of germanium and a transition metal. Since this optical article has the light transmissive conductive layer on the surface of the primary layer, functions such as prevention of static electricity and prevention of adhesion of dust can be imparted while suppressing the effect on the optical performance of the antireflection layer.

One of the typical examples of the antireflection layer is a multilayer film, and the primary layer may be one of the layers constituting the multilayer film. The primary layer may be a layer containing a transition metal capable of forming a compound with germanium.

Further, the optical article may further have an antifouling layer formed directly or via another layer on the primary layer having the conductive layer formed on the surface thereof.

Typical examples of the optical base material include a plastic lens base material. One form of the optical article is a spectacle lens, and still another aspect of the invention is directed to a pair of spectacles having spectacle lenses and a frame into which the spectacle lenses are fitted.

Still yet another aspect of the invention is a system having the above-mentioned optical article and a device that projects and/or picks up an image through the optical article. Typical examples of the system containing a projecting device include a projector. Typical examples of the optical article include a projecting lens, a dichroic prism, and a cover glass. The invention may be applied to a light valve such as LCD (liquid crystal device) which is one of the image forming devices or an element contained therein. Typical examples of the system containing a device that picks up an image through the optical article include a camera. Typical examples of the optical article include an imaging lens and a cover glass. The invention may be applied to CCD which is one of the image pickup devices and the like.

Further another aspect of the invention is directed to a system having the above-mentioned optical article and a medium accessible through the optical article. Typical examples of the system include an information recording apparatus such as DVD which has a built-in recording medium and is required to have a surface with low electric conductivity and a decoration which has a built-in medium that exhibits an aesthetic expression.

BRIEF DESCRIPTION OF THE DRAWINGS

The invention will be described with reference to the accompanying drawings, wherein like numbers reference like elements.

FIG. 3 is a table showing film forming conditions for an antireflection layer.

FIG. 4 is a table showing a layer structure and evaluation results of an antireflection layer.

FIG. 7 is a table showing film forming conditions for the antireflection layer shown in FIG. 6.

FIG. 8 is a table showing a layer structure and evaluation results of the antireflection layer shown in FIG. 6.

DESCRIPTION OF EXEMPLARY EMBODIMENTS

Figure 1:
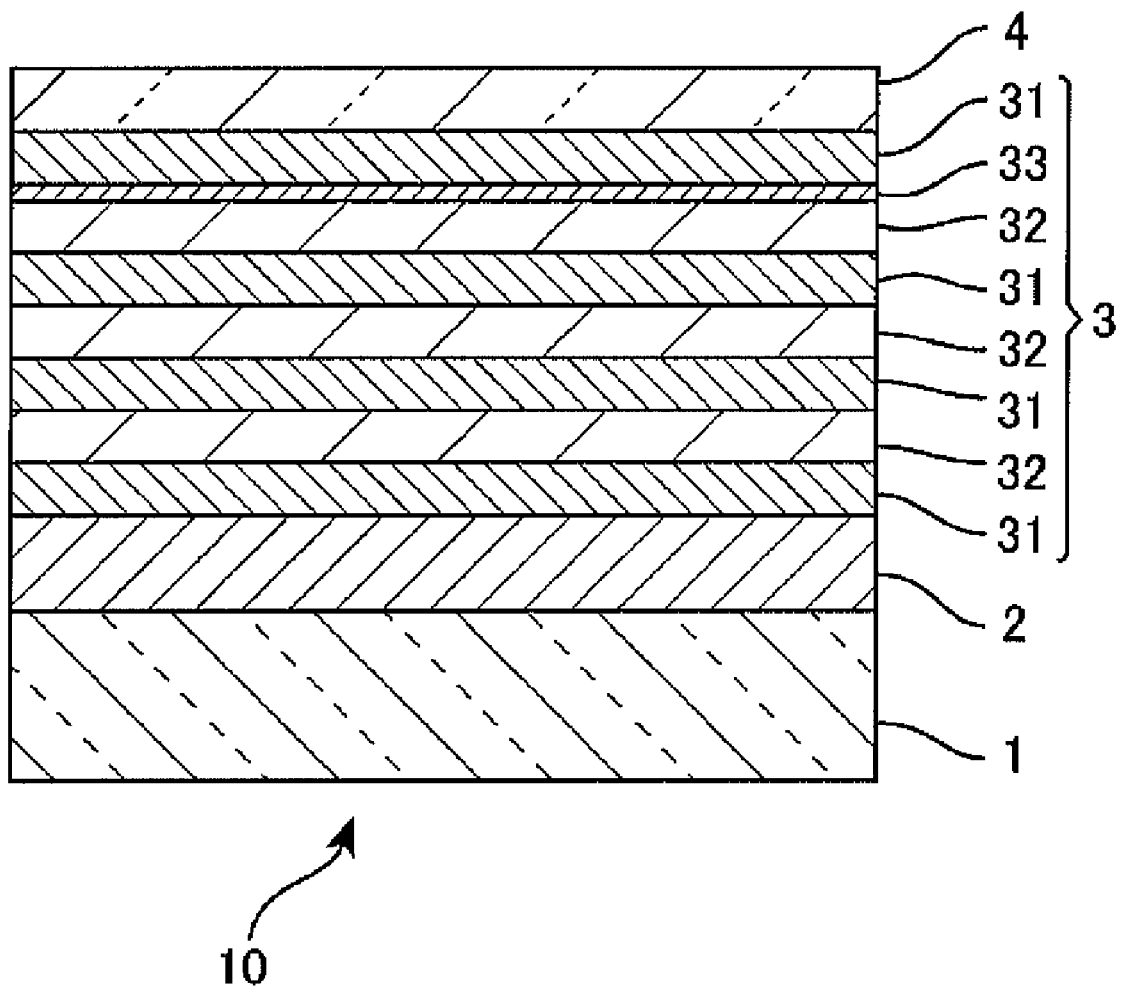
FIG. 1 is a cross-sectional view showing a structure of a lens containing an antireflection layer.

In FIG. 1, a structure of a lens according to an embodiment of the invention is shown by a view of a cross-section of the lens on one side centering on a base material. A lens 10 (also referred to as a lens sample) contains a lens base material 1 as an optical base material, a hard coat layer 2 formed on a surface of the lens base material 1, a light transmissive antireflection layer 3 formed on the hard coat layer 2, and an antifouling layer 4 formed on the antireflection layer 3.

1. Outline of Lens 1.1 Lens Base Material

The lens base material 1 is not particularly limited, however, a (meth) acrylic resin, a styrene resin, a polycarbonate resin, an allyl resin, an allyl carbonate resin such as a diethylene glycol bis(allyl carbonate) resin (CR-39), a vinyl resin, a polyester resin, a polyether resin, a urethane resin obtained by reacting an isocyanate compound with a hydroxy compound such as diethylene glycol, a thiourethane resin obtained by reacting an isocyanate compound with a polythiol compound, and a transparent resin obtained by curing a polymerizable composition containing a (thio) epoxy compound having one or more disulfide bonds in the molecule and the like can be exemplified. The refractive index of the lens base material 1 is, for example, from about 1.64 to 1.75. In this embodiment, it is permitted whether the refractive index is within or outside the above-mentioned range.

1.2 Hard Coat Layer (Primer Layer)

The hard coat layer 2 formed on the lens base material 1 is provided for improving scratch resistance. As a material to be used for the hard coat layer 2, an acrylic-based resin, a melamine-based resin, a urethane-based resin, an epoxy-based resin, a polyvinyl acetal-based resin, an amino-based resin, a polyester-based resin, a polyamide-based resin, a vinyl alcohol-based resin, a styrene-based resin, a silicone-based resin, and a mixture thereof or a copolymer thereof, and the like can be exemplified. One example of the hard coat layer 2 is a silicone-based resin, and a coating composition containing metal oxide fine particles and a silane compound is applied thereto, followed by curing, whereby a hard coat layer can be formed. In this coating composition, components such as colloidal silica and a polyfunctional epoxy compound can be incorporated.

Specific examples of the metal oxide fine particles include fine particles made of a metal oxide such as $SiO_2$, $Al_2O_3$, $SnO_2$, $Sb_2O_5$, $Ta_2O_5$, $CeO_2$, $La_2O_3$, $Fe_2O_3$, $ZnO$, $WO_3$, $ZrO_2$, $In_2O_3$, or $TiO_2$, or composite fine particles made of metal oxides of two or more metals. These fine particles are dispersed in a dispersion medium such as water, an alcohol or another organic solvent in a colloidal state, and the resulting dispersion can be mixed in the coating composition.

In order to secure the adhesion between the lens base material 1 and the hard coat layer 2, a primer layer can be provided between the lens base material 1 and the hard coat layer 2. The primer layer is also effective in improving impact resistance which is a weak point of a lens base material having a high refractive index. As a resin for forming the primer layer, an acrylic-based resin, a melamine-based resin, a urethane-based resin, an epoxy-based resin, a polyvinyl acetal-based resin, an amino-based resin, a polyester-based resin, a polyamide-based resin, a vinyl alcohol-based resin, a styrene-based resin, a silicone-based resin, and a mixture thereof or a copolymer thereof, and the like can be exemplified. As the primer layer for achieving adhesion, a urethane-based resin and a polyester-based resin are preferred.

As a typical method for forming the hard coat layer 2 and the primer layer, a method in which a coating composition is applied by a dipping method, a spinner method, a spray method, or a flow method, and the resulting coating is dried by heating at a temperature of from 40 to 200° C. for several hours can be used.

1.3 Antireflection Layer

Typical examples of the antireflection layer 3 to be formed on the hard coat layer 2 include an inorganic antireflection layer and an organic antireflection layer. The inorganic antireflection layer is composed of a multilayer film, and can be formed by, for example, alternately laminating a low refractive index layer having a refractive index of from 1.3 to 1.6 and a high refractive index layer having a refractive index of from 1.8 to 2.6. The number of layers is about 5 or 7. Examples of the inorganic substance to be used in the respective layers constituting the antireflection layer include $SiO_2$, SiO, $TiO_2$, TiO, $Ti_2O_3$, $Ti_2O_5$, $Al_2O_3$, $TaO_2$, $Ta_2O_5$, $NdO_2$, NbO, $Nb_2O_3$, $NbO_2$, $Nb_2O_5$, $CeO_2$, MgO, $SnO_2$, $MgF_2$, $WO_3$, $HfO_2$, $Y_2O_3$, and $ZrO_2$. These inorganic substances may be used alone or in admixture of two or more of them.

Examples of a method of forming the antireflection layer 3 include a dry method, for example, a vacuum vapor method, an ion plating method, and a sputtering method. In the vacuum vapor method, an ion beam-assisted method in which an ion beam is simultaneously irradiated during vapor can be used.

One of the methods for forming an organic antireflection layer 3 is a wet method. For example, the antireflection layer 3 can also be formed by using a coating composition for forming an antireflection layer containing silica fine particles having a hollow interior (hereinafter also referred to as "hollow silica fine particles") and an organosilicon compound to form a coating in the same manner as in the case of a hard coat layer or a primer layer. The reason why hollow silica fine particles are used here is that by the incorporation of a gas or a solvent having a lower refractive index than that of silica in the hollow interior, the refractive index of the hollow silica fine particles is further decreased as compared with that of silica fine particles without a hollow, and as a result, an excellent antireflection effect can be imparted. The hollow silica fine particles can be produced by the method described in JP-A-2001-233611 or the like, however, hollow silica fine particles having an average particle diameter of from 1 to 150 nm and a refractive index of from 1.16 to 1.39 can be used. The film thickness of this organic antireflection layer is preferably from 50 to 150 nm. When the thickness falls outside the range and is too large or too small, a sufficient antireflection effect may not be obtained.

1.4 Conductive Layer

Further, in the lens 10 according to an embodiment of the invention, a light transmissive conductive layer 33 containing a metal containing germanium as a main component and/or a compound of germanium and a transition metal is formed on a surface of at least one layer contained in the antireflection layer 3. In the lens 10 shown in FIG. 1, the conductive layer 33 is formed on a surface of a high refractive index layer 32 (also referred to as a $TiO_2$ layer or a $ZrO_2$ layer) under the uppermost layer of a low refractive index layer 31 (also referred to as an $SiO_2$ layer), that is, on a surface of the uppermost layer of the high refractive index layer 32.

One example of the conductive layer 33 is a thin film layer of a metal of germanium. Further, as the conductive layer 33, a thin film layer of a compound containing germanium can also be used. If a target layer on which the conductive layer is laminated, in this example, the high refractive index layer 32 is a layer (oxide layer) containing a transition metal capable of forming a compound with germanium, by driving germanium into the surface of the high refractive index layer 32 which becomes an underlying layer for lamination, the conductive layer 33 containing the compound can be formed. The conductive layer 33 may be formed by vapor of a compound of germanium.

The compound containing germanium is a transition metal-germanium compound called germanide or the like. Examples of the germanide include NaGe, AlGe, $KGe_4$, TiGe, $TiGe_2$, $Ti_5Ge_3$, $Ti_6Ge_5$, $V_3Ge$, $CrGe_2$, $Cr_3Ge_2$, CrGe, $Cr_3Ge$, $Cr_5Ge_3$, $Cr_{11}Ge_8$, MnGe, $Mn_5Ge_3$, CoGe, $CoGe_2$, $CO_5Ge_7$, NiGe, CuGe, $Cu_3Ge$, $ZrGe_2$, ZrGe, $RbGe_4$, $NbGe_2$, $Nb_2Ge$, $Nb_3Ge$, $Nb_5Ge_3$, $Nb_3Ge_2$, $NbGe_2$, $Mo_3Ge$, $Mo_3Ge_2$, $Mo_5Ge_3$, $Mo_2Ge_3$, $MoGe_2$, $CeGe_4$, RhGe, PdGe, AgGe, $Hf_5Ge_3$, HfGe, $HfGe_2$, $TaGe_2$, and PtGe.

1.5 Antifouling Layer

A water-repellent film or a hydrophilic antifogging film (antifouling layer) 4 is often formed on the antireflection layer 3. The antifouling layer 4 is a layer made of a fluorine-containing organosilicon compound and formed on the antireflection layer 3 for the purpose of improving the water and oil repellent performance of the surface of the optical article (lens) 10. As the fluorine-containing organosilicon compound, a fluorine-containing silane compound described in, for example, JP-A-2005-301208 or JP-A-2006-126782 can be preferably used.

Such a fluorine-containing silane compound is preferably used as a water-repellent treatment liquid (a coating composition for forming the antifouling layer) prepared by dissolving the compound in an organic solvent at a predetermined concentration. The antifouling layer can be formed by applying this water-repellent treatment liquid (coating composition for forming the antifouling layer) on the antireflection layer. As the application method, a dipping method, a spin coating method, or the like can be used. It is also possible to form the antifouling layer using a dry method such as a vacuum vapor method after filling a metal pellet with the water-repellent treatment liquid (coating composition for forming the antifouling layer).

The film thickness of the antifouling layer is not particularly limited, however, it is preferably from 0.001 to 0.5 μm, and more preferably from 0.001 to 0.03 μm. When the film thickness of the antifouling layer is too small, the water and oil repellent effect becomes poor, and when the film thickness is too large, the surface becomes sticky, and therefore it is not preferred. Further, when the thickness of the antifouling layer is larger than 0.03 μm, the antireflection effect may be decreased.

2. Production of Sample

2.1 Example 1

Sample S1

2.1.1 Selection of Lens Base Material and Formation of Hard Coat Layer

As a lens base material 1, a plastic lens base material for spectacles (manufactured by Seiko Epson Corporation, trade name: Seiko Super Sovereign (SSV)) having a refractive index of 1.67 was used.

An application liquid (coating liquid) for forming a hard coat layer 2 was prepared as follows. In 20 parts by weight of Epoxy Resin/Silica Hybrid (trade name: Compoceran (registered trademark) E102 (manufactured by Arakawa Chemical industries, Ltd.)), 4.46 parts by weight of an acid anhydride-based curing agent (trade name: liquid curing agent (C2) (manufactured by Arakawa Chemical industries, Ltd.)) was mixed and stirred, whereby an application liquid (coating liquid) was obtained. This coating liquid was applied on the lens base material 1 to a predetermined thickness using a spin coater, whereby the hard coat layer 2 was formed. The lens base material after application was baked at 125° C. for 2 hours.

2.1.2 Formation of Antireflection Layer 2.1.2.1 Vapor Apparatus

Figure 2:
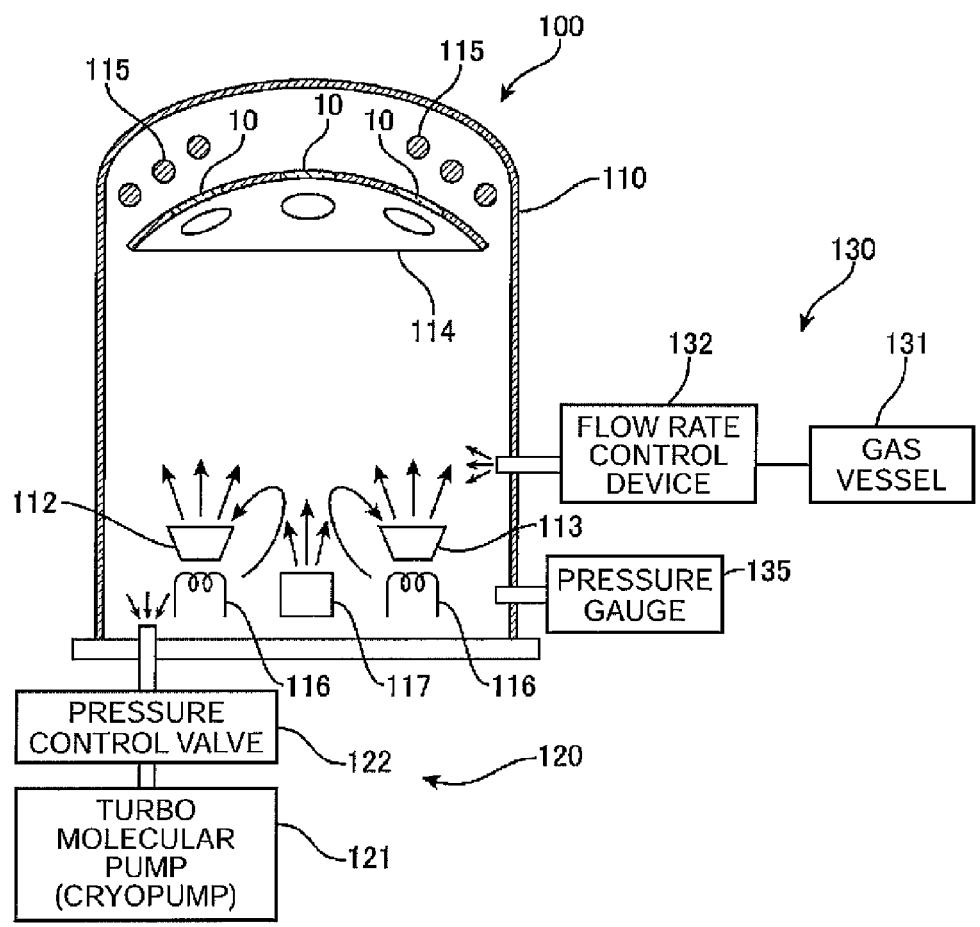
FIG. 2 is a diagram schematically showing a vapor apparatus to be used in the production of an antireflection layer.

Subsequently, an inorganic antireflection layer 3 was formed by a vacuum vapor apparatus 100 shown in FIG. 2. The illustrated vacuum vapor apparatus 100 is an electron beam vapor apparatus and is provided with a vacuum vessel 110, an air exhaust device 120 and a gas supply device 130. The vacuum vessel 110 is provided with a sample support stand 114 on which a lens sample 10 having a coating up to the hard coat layer 2 is placed, base material-heating heaters 115 for heating the lens sample 10 placed on the sample support stand 114, and filaments 116 that generate thermal electrons. The thermal electrons are accelerated by an electron gun (not shown) and a vapor material placed in evaporation sources (crucibles) 112 and 113 are irradiated with the thermal electrons and evaporated, whereby the material is vapor-deposited on the lens sample 10.

Further, the vacuum vapor apparatus 100 is provided with an ion gun 117 for irradiating the lens sample 10 by ionizing and accelerating a gas introduced into the inside of the vacuum vessel 110 to effect ion-assisted vapor. Further, the vacuum vessel 110 can be further provided with a cold trap for removing residual water, a device for controlling a film thickness or the like. As the device for controlling a film thickness, for example, a reflection-type optical film thickness monitor, a quartz crystal film thickness monitor, or the like is used.

The inside of the vacuum vessel 110 can be kept high vacuum, for example, at $1 \times 10^{-4}$ Pa by a turbo molecular pump or a cryopump 121 and a pressure control valve 122 contained in the air exhaust device 120. On the other hand, the inside of the vacuum vessel 110 can be made a predetermined gas atmosphere by the gas supply device 130. For example, in a gas vessel 131, argon (Ar) nitrogen ($N_2$), oxygen ($O_2$) or the like is provided. The flow rate of the gas can be controlled by a flow rate control device 132, and the internal pressure of the vacuum vessel 110 can be controlled by a pressure gauge 135.

The base material-heating heater 115 is, for example, an infrared lamp and functions to heat the lens sample 10 to remove gas or water, and therefore, the adhesion of the film formed on the surface of the lens sample 10 is secured.

Accordingly, main vapor conditions in this vacuum vapor apparatus 100 are the vapor material, the accelerating voltage and current of the electron gun, and with or without ion assist. The conditions in the case where ion assist is used are given by the type of ion (atmosphere in the vacuum vessel 110) and the voltage and current of the ion gun 117. Hereinafter, unless otherwise stated, the accelerating voltage and current of the electron gun are selected from the range of from 5 to 10 kV and the range of from 50 to 500 mA, respectively, based on the film formation rate or the like. Further, in the case where ion assist is used, the voltage and current of the ion gun 117 are selected from the range of from 200 V to 1 kV and the range of from 100 to 500 mA, respectively, based on the film formation rate or the like.

2.1.2.2 Formation of Low Refractive Index Layer and High Refractive Index Layer

The lens sample 10 having the hard coat layer 2 formed thereon was washed with acetone and subjected to a heat treatment at about 70° C. in the inside of the vacuum vessel 110 to evaporate water adhering to the lens sample 10. Subsequently, the surface of the lens sample 10 was subjected to ion cleaning. Specifically, oxygen ion beam was irradiated to the surface of the lens sample 10 at an energy of several hundreds of electron volts using the ion gun 117 and organic substances adhering to the surface of the lens sample 10 were removed. By this method, the adhesion strength of a film formed on the surface of the lens sample 10 can be increased. Incidentally, the same treatment can be performed using an inert gas such as Ar, xenon (Xe) or $N_2$ in place of an oxygen ion, or oxygen radical or oxygen plasma irradiation can also be performed.

After the inside of the vacuum vessel 110 was sufficiently evacuated to vacuum, as shown in FIG. 1, an antireflection layer 3 was formed by alternately laminating a silicon dioxide ($SiO_2$) layer as a low refractive index layer 31 and a titanium oxide ($TiO_2$) layer as a high refractive index layer 32 by an electron beam vacuum vapor method. The first layer, third layer, fifth layer, and eight layer were each the low refractive index layer 31, and each of the $SiO_2$ layers 31 was formed by vacuum vapor of silicon dioxide without ion assist.

The second layer, fourth layer, and sixth layer were each the high refractive index layer 32, and each of the $TiO_2$ layers 32 was formed by ion-assisted vapor of titanium oxide ($TiO_2$) while introducing an oxygen gas. Incidentally, the seventh layer was a conductive layer 33 as described below.

FIG. 3 shows the film forming conditions for the respective layers of $SiO_2$ layers 31 and $TiO_2$ layers 32 and the film thicknesses thereof. In this lens sample 10, the refractive indices of the hard coat layer 2, the $SiO_2$ layer 31, and $TiO_2$ layer 32 are 1.65, 1.462, and 2.43, respectively.

2.1.2.3 Formation of Conductive Layer

In this Example 1, after laminating layers from the first layer to the sixth layer, as the seventh layer (conductive layer 33), Ge (germanium) was vapor-deposited under the following conditions. That is, after forming the sixth layer ($TiO_2$ layer 32), a film was formed by vacuum vapor of Ge (germanium) on the sixth layer which was used as an underside layer (primary layer), whereby the seventh layer of the conductive layer 33 was formed. On the conductive layer 33, a low refractive index layer 31 which was the outermost layer (uppermost layer) was further formed as the eighth layer.

Film forming conditions for conductive layer 33
    Underside layer (primary layer): $TiO_2$
    Vapor source: Metal Ge
    Film formation rate: 0.1 nm/sec
    Vapor time: 40 sec
    Ion-assisted vapor: Without 2.1.3 Formation of Antifouling Layer After the antireflection layer 3 was formed, the surface of the $SiO_2$ layer 31 which was the eighth layer was subjected to an oxygen plasma treatment. Then, in the vapor apparatus, a pellet material impregnated with "KY-130" (trade name, manufactured by Shin-Etsu Chemical Co., Ltd.) containing a fluorine-containing organosilicon compound having a high molecular weight was used as a vapor source, which was heated at about 500° C. to evaporate KY-130, whereby an antifouling layer 4 was formed. The vapor time was set to about 3 minutes. By performing the oxygen plasma treatment, silanol groups can be generated on the surface of the final $SiO_2$ layer 31, and therefore, chemical adhesion (chemical bonding) between the antireflection layer 3 and the antifouling layer 4 can be improved. After completion of vapor, the lens sample 10 was taken out from the vacuum vapor apparatus 100, turned over, and placed back in the apparatus again. Then, the above-mentioned procedure was repeated in the same order to form the antireflection layer 3 containing a germanium layer and the antifouling layer 4. Thereafter, the lens sample 10 was taken out from the vacuum vapor apparatus 100.

In Sample S1 of Example 1, the hard coat layer 2, the antireflection layer 3 containing the conductive layer 33 obtained by vapor of germanium in between the layers, and the antifouling layer 4 are formed on both surfaces of the lens base material 1 which is a plastic lens.

2.2 Example 2

Sample S2

In Example 2, a transparent white plate glass (B270) was used as a lens base material 1, and an antireflection layer 3 was formed directly on the lens base material 1 without forming a hard coat layer 2 by alternately laminating a silicon dioxide ($SiO_2$) layer as a low refractive index layer 31 and a titanium oxide ($TiO_2$) layer as a high refractive index layer 32 under the same film forming conditions as in Example 1. The first layer, third layer, fifth layer, and eight layer were each the low refractive index layer 31, and the second layer, fourth layer, and sixth layer were each the high refractive index layer 32. Further, a conductive layer 33 was formed as the seventh layer under the same film forming conditions as in Example 1. Moreover, an antifouling layer 4 was formed on the antireflection layer 3.

2.3 Examples 3 and 4

Lens Sample S3 and Glass Sample S4

Sample 53 using a plastic lens as a lens base material 1 and Sample S4 using a white plate glass as a lens base material 1 were produced in the same manner as in Example 1 and Example 2, respectively. However, the film forming conditions for a conductive layer 33 were changed as follows.
Film forming conditions for conductive layer 33
  Underside layer (primary layer): $TiO_2$
  Vapor source: Metal Ge
  Film formation rate: 0.1 nm/sec
  Vapor time: 10 sec
  Ion-assisted vapor: With
  Ion energy: 500 eV (Gas species; argon, Beam current: 150 mA, Bias current: 250 mA)

2.4 Examples 5 and 6

Lens Sample S5 and Glass Sample S6

Sample S5 using a plastic lens as a lens base material 1 and Sample S6 using a white plate glass as a lens base material 1 were produced in the same manner as in Example 1 and Example 2, respectively. However, the film forming conditions for a conductive layer 33 were changed as follows.
Film forming conditions for conductive layer 33
  Underside layer (primary layer): $TiO_2$
  Vapor source: Metal Ge
  Film formation rate: 0.1 nm/sec
  Vapor time: 10 sec
  Ion-assisted vapor: With
  Ion energy: 800 eV (Gas species: argon, Beam current: 150 mA, Bias current: 250 mA)

2.5 Comparative Example 1

Sample R1

In order to perform comparison with the lens samples obtained in the above-mentioned Examples, in Comparative example 1, Sample R1 using a plastic lens as a lens base material 1 was produced in the same manner as in Example 1. However, a conductive layer was formed with indium tin oxide (ITO). The film forming conditions are as follows. Further, the film thicknesses (nm) of the layers from the first layer to the sixth layer and the eighth layer were set to 28.4, 6.7, 204.3, 23.2, 35.7, 26.7, and 99.5, respectively.
Film forming conditions for conductive layer 33
  Underside layer (primary layer): $TiO_2$
  Vapor source: ITO
  Film formation rate: 0.1 nm/sec
  Film thickness: 2.5 nm
  Ion-assisted vapor: With
  Ion energy: 500 eV (Gas species: oxygen, Beam current: 250 mA, Bias current: 350 mA)

2.6 Comparative Examples 2 and 3

Lens Sample R2 and Glass Sample R3

Sample R2 using a plastic lens as a lens base material 1 and Sample R3 using a white plate glass as a lens base material 1 were produced in the same manner as in Example 1 and Example 2, respectively. However, a conductive layer 33 was not formed.

3. Evaluation of Samples S1 to S6 and R1 to R3

Samples S1 to S6 and R1 to R3 produced in the above were evaluated for sheet resistance and transparency.

3.1 Measurement of Sheet Resistance

Figure 5A:
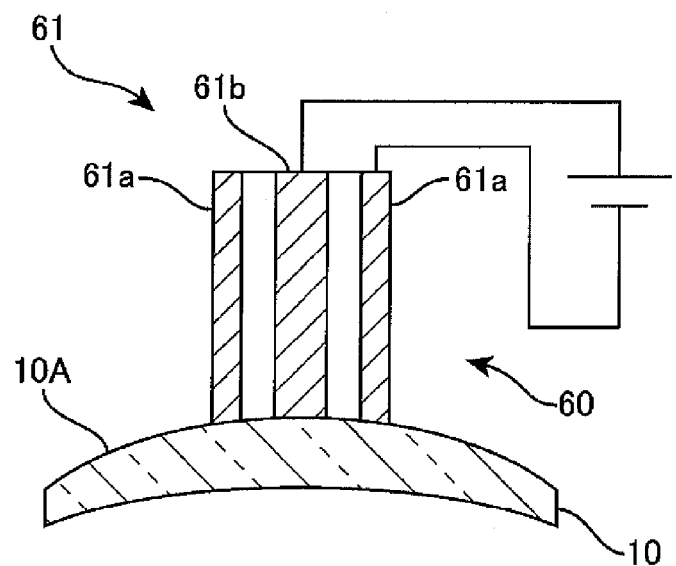
FIG. 5A is a cross-sectional view showing a way of measuring a sheet resistance.
Figure 5B:
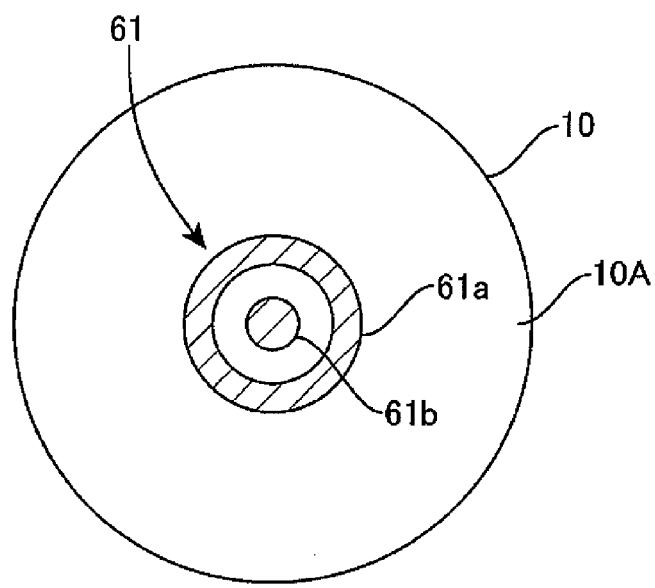
FIG. 5B is a plan view showing a way of measuring a sheet resistance.

FIGS. 5A and 5B show away of measuring a sheet resistance of each sample. In this example, a ring probe 61 was brought into contact with an object to be measured, for example, the surface 10A of the lens sample 10, and the sheet resistance of the surface 10A of the lens sample 10 was measured. As a measuring device 60, a high resistance meter (Hiresta UP MCP-HT450 manufactured by Mitsubishi Chemical Analytech Co., Ltd.) was used. The ring probe 61 used here is URS probe, and has two electrodes: an outer ring electrode 61a and an inner circular electrode 61b. The outer ring electrode 61a has an outer diameter of 18 mm and an inner diameter of 10 mm, and the inner circular electrode 61b has a diameter of 7 mm. A voltage of from 1000 V to 10 V was applied between these electrodes, and the sheet resistance of each sample was measured. FIG. 4 shows the measurement value of the sheet resistance after a lapse of 24 hours from the production of each sample.

3.2 Observation of Transparency

Each sample was visually evaluated for transparency. FIG. 4 shows the results of evaluation of each sample.

3.3 Evaluation

Samples S1 and S2 obtained by vapor of germanium without ion assist were transparent but a slight light brown coloration was observed. In the other samples, almost no decrease in transparency was observed. Accordingly, the conductive layer 33 obtained by vapor of germanium has high light transmittance and can be said to be light transmissive (transparent). Further, in Samples S1 and S2, a slight light brown coloration was observed, and germanium was vapor-deposited without ion assist, and therefore, it is considered that the possibility that a layer containing germanium as a main component is formed as the conductive layer 33 on the surface of the TiO$_2$ layer 32 which is the primary layer (underside layer) is high.

On the other hand, in Samples S3, S4, S5, and S6 obtained by vapor of germanium using ion assist, coloration was not observed. It is considered that in these samples, by vapor-depositing germanium and driving it into the surface of the TiO$_2$ layer 32 which is the underside layer (primary layer) through ion-assisted vapor, the possibility that a germanium atom undergoes a chemical reaction with titanium and forms germanide (TiGe) in a surface region of the TiO$_2$ layer 32 due to a mixing effect is high. Accordingly, it is considered that the conductive layer 33 of each of these Samples S3 to S6 is a layer containing, as a main component, titanium germanide which is a compound obtained by chemical reaction of germanium with titanium which is a transition metal. As the titanium germanide contained in the conductive layer 33, any one or a plurality of TiGe, TiGe$_2$, Ti$_5$Ge$_3$, and Ti$_6$Ge$_5$ is/are considered to be contained.

The measurement values of the sheet resistances of Samples R2 and R3 in which the conductive layer 33 was not formed were each $5 \times 10^{13}\Omega/\square$, and the measurement value of the sheet resistance of Lens Sample R1 in which the ITO layer was incorporated in the antireflection layer 3 was $2 \times 10^{13}\Omega/\square$. On the other hand, the measurement values of the sheet resistances of Samples S1 and S6 were from $5 \times 10^9$ to $4 \times 10^{11}\Omega/\square$. Accordingly, in Samples S1 to SE which were treated with germanium, the measurement value of the sheet resistance was decreased by about double to quadruple digits ($10^2$ to $10^4$).

In particular, in Samples S3 to S6 in which a layer containing germanide as a main component was expected to be formed as the conductive layer 33, also coloration was not observed, and therefore, the measurement value of the sheet resistance could be decreased to about $5 \times 10^9$ to $4 \times 10^{11}\Omega/\square$ almost without affecting transparency which is important as an optical article.

From these results, it is found that by treating the surface of one constituent layer of the antireflection layer 3 with germanium, the sheet resistance of the resulting optical article such as a lens or a cover glass can be reduced. Typical effects of reduction in the sheet resistance of an optical article are an antistatic effect and an electromagnetic shielding effect. For example, it is considered that a guide as to whether a spectacle lens has an antistatic property is that the lens has a sheet resistance of $1 \times 10^{12}\Omega/\square$ or less at which adhesion of dust becomes difficult to observe. The above-mentioned Samples S1 to S6 each have a sheet resistance of $1 \times 10^{12}\Omega/\square$ or less which was measured by the above-mentioned measurement method, and are found to have an excellent antistatic property.

Further, germanium has a low evaporation temperature at the time of vacuum vapor and is a substance which is easily vapor-deposited. As compared with silicon which is often used in a low refractive index layer 31 of an antireflection layer 3, germanium has a lower evaporation temperature, and vapor thereof is easily performed. Further, germanium is easily melted and bumping thereof hardly occurs when it is heated at the time of vapor, and also the reactivity with a material is not high and evaporation is easy and thus, any hearth can be used. Accordingly, formation of a conductive layer 33 using germanium is substantially equal to or easier than formation of a low refractive index layer 31 of an antireflection layer 3, and as compared with the case where a conductive layer is formed using a noble metal such as gold or silver, it is considered that the production is easier and the economical advantage is larger.

Further, germanium and germanide are stable with respect to an acid and an alkali in much the same way as silicon and silicide, and unlike ITO, silver, or the like, peeling thereof due to corrosion hardly occurs. Accordingly, it is considered that by producing an optical article having an antireflection layer 3 containing a conductive layer 33 formed using germanium, the optical article having excellent antistatic performance, and also having high durability and reliability can be provided.

4. Other Examples

4.1 Example 7

Sample S7

In the same manner as in the above-mentioned Example 1, a plastic lens was used as a lens base material 1 and a hard coat layer 2 was formed. Further, low refractive index layers 31 and high refractive index layers 32 were formed.

Figure 6:
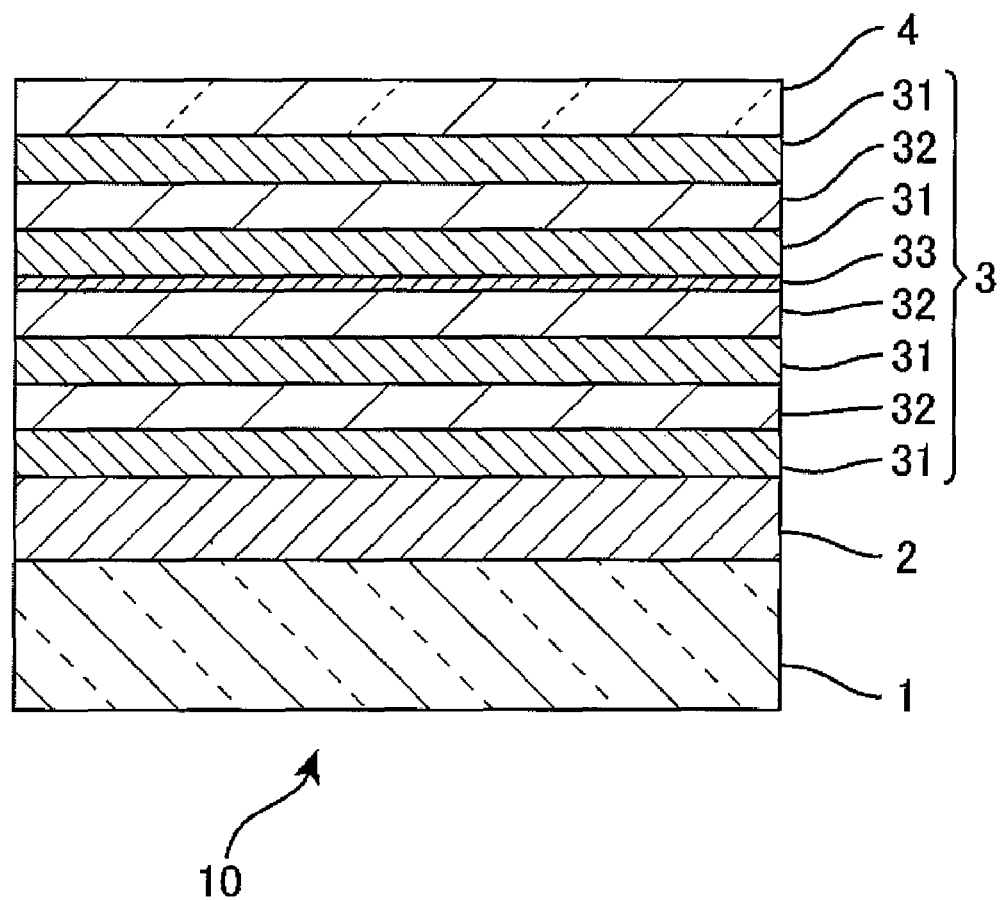
FIG. 6 is a cross-sectional view showing a structure of a lens containing a different antireflection layer.

However, in this Example 7, as shown in FIG. 6, an antireflection layer 3 was formed by using a silicon dioxide (SiO$_2$) layer as the low refractive index layer 31 and a zirconium oxide (ZrO$_2$) layer as the high refractive index layer 32. That is, the first, third, sixth, and eight layers were each the low refractive index layer 31, and each SiO$_2$ layer 31 was formed by vapor of silicon dioxide (SiO$_2$) without ion assist.

The second layer, fourth layer, and seventh layer were each the high refractive index layer 32, and each ZrO$_2$ layer 32 was formed by vapor of zirconium oxide. Incidentally, the fifth layer was a conductive layer 33 as described below.

FIG. 7 shows the film forming conditions for the respective layers of SiO$_2$ layers 31 and ZrO$_2$ layers 32 and the film thicknesses thereof. In this lens sample 10, the refractive indices of the hard coat layer 2, the SiO$_2$ layer 31, and ZrO$_2$ layer 32 are 1.65, 1.462, and 2.058, respectively.

In this Example 7, after laminating layers from the first layer to the fourth layer, as the fifth layer (conductive layer 33), Ge (germanium) was vapor-deposited under the following conditions. That is, after forming the fourth layer (ZrO$_2$ layer 32), a film was formed by vacuum vapor of Ge (germanium) on the fourth layer which was used as an underside layer (primary layer), whereby the fifth layer of the conductive layer 33 was formed on the fourth layer of the ZrO$_2$ layer 32. On the conductive layer 33, films were further formed from the sixth, layer to the eighth layer.

Film forming conditions for conductive layer 33
    Underside layer (primary layer): ZrO$_2$ (With the proviso that as an underlying layer, a TiOx layer was formed on the underside layer (primary layer) which is the fourth layer, followed by vapor of germanium.) (Underlying layer: Vapor source: TiOx, vacuum vapor (without ion assist), film thickness: 2 nm)
    Vapor source: Metal Ge
    Film formation rate: 0.125 nm/sec
    Vapor time: 12 sec
    Ion-assisted vapor: With
    Ion energy: 1000 eV (Gas species: argon, Beam current: 150 mA)

Further, an antifouling layer 4 was formed on the antireflection layer 3 in the same manner as in Example 1.

4.2 Example 8

Sample S8

In Example 8, in the same manner as in Example 2, a transparent white plate glass (B270) was used as a lens base material 1. In this Example 8, an antireflection layer 3 was formed directly on the lens base material 1 without forming a hard coat layer 2 by alternately laminating a silicon dioxide (SiO$_2$) layer as a low refractive index layer 31 and a zirconium oxide (ZrO$_2$) layer as a high refractive index layer 32 under the same film forming conditions as in Example 7. The first layer, third layer, sixth layer, and eight layer were each the low refractive index layer 31, and the second layer, fourth layer, and seventh layer were each the high refractive index layer 32. Further, a conductive layer 33 was formed as the fifth layer under the same film forming conditions as in Example 7. Moreover, an antifouling layer 4 was formed on the antireflection layer 3.

4.3 Examples 9 and 10

Lens Sample S9 and Glass Sample S10

Sample S9 using a plastic lens as a lens base material 1 and Sample S10 using a white plate glass as a lens base material 1 were produced in the same manner as in Example 7 and Example 8, respectively. However, the film forming conditions for a conductive layer 33 were changed as follows.
Film forming conditions for conductive layer 33
Underside layer (primary layer): ZrO$_2$ (With the proviso that as an underlying layer, a TiOx layer was formed on the underside layer (primary layer) which is the fourth layer, followed by vapor of germanium.) (Underlying layer: Vapor source: TiOx, vacuum vapor (without ion assist), film thickness: 1 nm)
Vapor source: Metal Ge
Film formation rate: 0.0625 nm/sec
Vapor time: 8 sec
Ion-assisted vapor: With
Ion energy: 600 eV (Gas species: argon, Beam current: 150 mA)

4.4 Examples 11 and 12

Lens Sample S11 and Glass Sample S12

Sample S11 using a plastic lens as a lens base material 1 and Sample S12 using a white plate glass as a lens base material 1 were produced in the same manner as in Example 7 and Example 8, respectively. However, the film forming conditions for a conductive layer 33 were changed as follows.
Film forming conditions for conductive layer 33
Underside layer (primary layer): ZrO$_2$ (With the proviso that as an underlying layer, a TiOx layer was formed on the underside layer (primary layer) which is the fourth layer, followed by vapor of germanium.) (Underlying layer: Vapor source: TiOx, vacuum vapor (without ion assist), film thickness: 1 nm)
Vapor source: Metal Ge
Film formation rate: 0.025 nm/sec
Vapor time: 8 sec
Ion-assisted vapor: With
Ion energy: 600 eV (Gas species: argon, Beam current: 150 mA)

4.5 Examples 13 and 14

Lens Sample S13 and Glass Sample S14

Sample S13 using a plastic lens as a lens base material 1 and Sample S14 using a white plate glass as a lens base material 1 were produced in the same manner as in Example 7 and Example 8, respectively. However, the film forming conditions for a conductive layer 33 were changed as follows.
Film forming conditions for conductive layer 33
Underside layer (primary layer): ZrO$_2$
Vapor source: Metal Ge
Film formation rate: 0.025 nm/sec
Vapor time: 8 sec
Ion-assisted vapor: Without 4.6 Examples 15 and 16

Lens Sample S15 and Glass Sample S16

Sample S15 using a plastic lens as a lens base material 1 and Sample S16 using a white plate glass as a lens base material 1 were produced in the same manner as in Example 7 and Example 8, respectively. However, the film forming conditions for a conductive layer 33 were changed as follows.
Film forming conditions for conductive layer 33
Underside layer (primary layer): ZrO$_2$
Vapor source: Metal Ge
Film formation rate: 0.125 nm/sec
Vapor time: 8 sec
Ion-assisted vapor: With
Ion energy: 800 eV (Gas species: argon, Beam current: 150 mA)

4.7 Comparative Example 4

Sample R4

In order to perform comparison with the samples obtained in the above-mentioned Examples, in Comparative example 4, Sample R4 using a glass base plate as a lens base material 1 was produced in the same manner as in Example 7. However, a conductive layer 33 was not formed. That is, the antireflection layer 3 has a structure of seven layers in total without containing a conductive layer 33 of the fifth layer, and other configurations are as shown in FIG. 7. The film thicknesses (nm) of the respective layers from the first layer to the seventh layer were 28, 8, 208, 35, 21, 57, and 95, respectively, when rounded off to the whole number.

5. Evaluation of Samples S7 to S16 and R4

Samples S7 to S16 and R4 produced in the above were evaluated for sheet resistance and absorption loss. The sheet resistance was measured in the same manner as in the above item 3.1.

The absorption loss was measured for Glass Samples S10, S12, S14, and S16, and compared with that of Glass Sample R4. In the measurement of the light absorption loss, a spectrophotometer U-4100 manufactured by Hitachi, Ltd. was used. The reflectance and transmittance were measured using the spectrophotometer and an absorptance at around 600 nm was calculated from the equation (A).

$$(\text{absorptance(absorption loss)})=100\%-(\text{transmittance})-(\text{reflectance}) \quad (A)$$

The measurement values of the sheet resistance and the absorptance are summarized in FIG. 8. In FIG. 8, the measurement value after a lapse of 24 hours from the production of each sample is shown. However, as for the sheet resistances of Samples S15 and S16, data immediately after the production of sample are shown.

As can be seen from the measurement results of the absorption loss, except Sample S8 in which a brown coloration was observed, almost no increase in absorption loss relative to that of Sample R4 which is a comparative example was observed, and almost no deterioration in light transmittance (transparency and transmittance) due to the formation of the conductive layer 33 was observed. Accordingly, also in these examples, the conductive layer 33 formed by vapor of germanium has high light transmittance and can be said to be light transmissive (transparent). Further, an increase in light absorption loss measured in these samples is about 2%, which is a level to such an extent that it does not have a particular problem as a spectacle lens.

As for the measurement value of the sheet resistance, the measurement value of the sheet resistance of Glass Sample R4 which does not have a conductive layer is $5 \times 10^{14} \Omega/\square$, however, in the samples containing the conductive layer 33 formed by vapor of germanium, the measurement value of the sheet resistance decreased to a value lower than $4 \times 10^{13} \Omega/\square$. Accordingly, the optical articles each having the conductive layer 33 formed by vapor of germanium have high electric conductivity, and therefore have antistatic performance also in these examples.

In Samples S7 to S12 obtained by performing vapor of germanium through an ion-assisted vapor method after forming a TiOx layer as an underlying layer, as described above, it is considered that the conductive layer 33 containing germanide (TiGe or ZrGe) is formed. In these Samples S7 to S12, the measurement values of the sheet resistances fell within the range of from $1 \times 10^9$ to $1 \times 10^{10} \Omega/\square$, and the results that the sheet resistance was decreased by about quadruple to quintuple digits ($10^4$ to $10^5$) were obtained. Accordingly, it is found that in the same manner as an antireflection layer having a TiO$_2$/SiO$_2$ multilayer structure, also in the case of an antireflection layer having a ZrO$_2$/SiO$_2$ multilayer structure, an optical article having a sheet resistance of, for example, $1 \times 10^{12} \Omega/\square$ or less, which is a guide as to whether a spectacle lens has an antistatic property can be provided by incorporating a conductive layer 33 formed by vapor of germanium in the antireflection layer.

As described above, it was found that by incorporating a layer containing germanium as a main component in the antireflection layer 3, even if it is a thin film having a film thickness of several nanometers or less, the sheet resistance is decreased, and an antistatic function can be obtained almost without affecting the light transmittance of the antireflection layer 3. It was also found that by driving germanium into a layer containing a transition metal such as titanium by ion-assisted vapor or the like, the sheet resistance can be further decreased. The reason is considered to be that by driving germanium into a layer containing a transition metal such as titanium by ion-assisted vapor or the like, germanide (an intermetallic compound) can be formed, and there may be a substantially proportional relationship between the synthetic efficiency of germanide and the decrease in the sheet resistance. Further, it is considered that the synthetic efficiency of germanide is increased as the ion-assist energy is higher.

Further, germanium and germanide are hardly corroded by an acid or an alkali, and therefore, the above-mentioned conductive layer 33 is expected to have excellent chemical resistance. It could be confirmed that the sheet resistance was decreased to $1 \times 10^{12} \Omega/\square$ or less by incorporating the above-mentioned conductive layer 33, and an optical article having an antistatic function, particularly, a preferred antistatic function for preventing adhesion of dust can be produced.

Incidentally, an example of using TiOx as the underlying layer is described in the above, however, it is also possible to use TiO$_2$.

The layer structures of the antireflection layer shown in the above-mentioned Examples are illustrative only, and the invention is by no means limited to these layer structures. For example, it is also possible to apply the invention to an antireflection layer having a structure of seven or less layers, or nine or more layers. Further, the number of conductive layers to be incorporated in the antireflection layer is not limited to one. Further, the combination of a high refractive index layer and a low refractive index layer is not limited to TiO$_2$/SiO$_2$ or ZrO$_2$/SiO$_2$, and a conductive layer containing germanium can be formed on the surface of any layer in a multilayer structure of Ta$_2$O$_5$/SiO$_2$, NdO$_2$/SiO$_2$, HfO$_2$/SiO$_2$, Al$_2$O$_3$/SiO$_2$, or the like.

Further, the invention can be applied not only to an inorganic antireflection layer described above, but also to an organic antireflection layer. For example, a conductive layer containing germanide can be formed by driving germanium through an ion-assisted vapor into an underlying layer after forming a TiOx layer (or a TiO$_2$ layer) having a film thickness of about several nanometers on an organic antireflection layer as the underlying layer.

Figure 9:
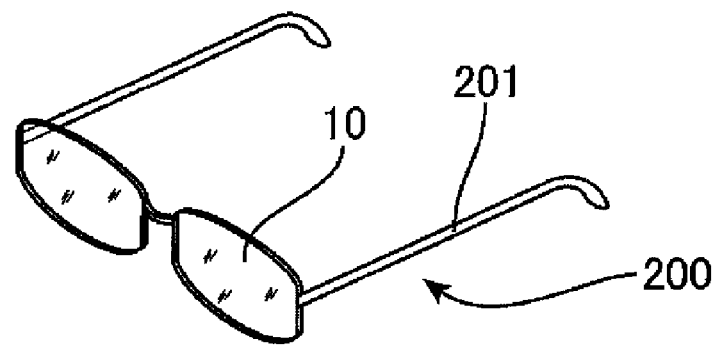
FIG. 9 is a view showing an outline of a pair of spectacles.
Figure 10:
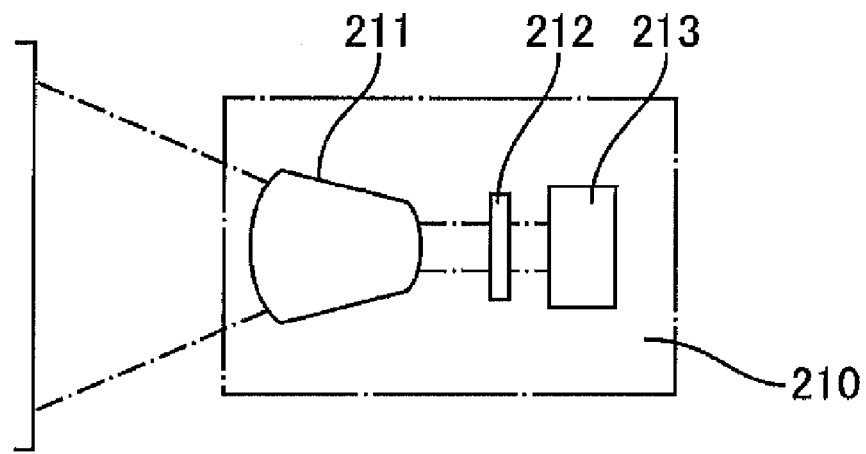
FIG. 10 is a view showing an outline of a projector.
Figure 11:
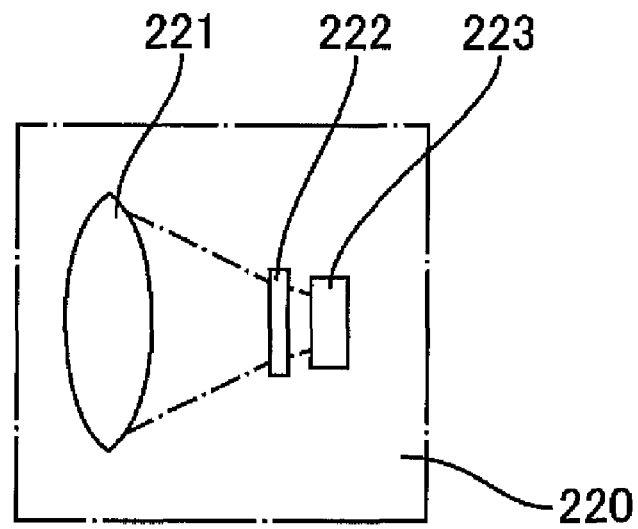
FIG. 11 is a view showing an outline of a digital camera.
Figure 12:
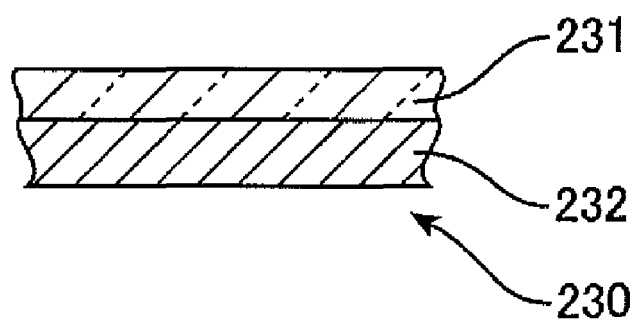
FIG. 12 is a view showing an outline of a recording medium.

FIG. 9 shows a pair of spectacles 200 containing a lens 10 serving as a spectacle lens having a conductive layer containing germanium and a frame 201 into which the lens 10 is fitted. Further, FIG. 10 shows a projector 210 provided with a projection lens 211 having a conductive layer containing germanium, a cover glass 212 having a conductive layer containing germanium, and an image forming device (for example, LCD 213) that generates light to be projected through the projection lens 211 and the cover glass 212. Further, FIG. 11 shows a digital camera 220 provided with an image pickup lens 221 having a conductive layer containing germanium, a cover glass 222 having a conductive layer containing germanium, and an image pickup device (for example, CCD 223) that picks up an image through the image pickup lens 221 and the cover glass 222. Further, FIG. 12 shows a recording medium (for example DVD 230) provided with a transmissive layer 231 having a conductive layer containing germanium and a recording layer 232 capable of reading and writing of a record by an optical method.

According to the invention, an optical article which can be applied to any of these systems, for example, a lens, a glass, a prism, or a cover layer, and has an antistatic function of enabling the prevention of adhesion of dust can be provided. Further, the systems shown in the above are illustrative only, and optical articles and systems to which a person skilled in the art can apply the invention are included in the invention.

The entire disclosure of Japanese Patent Application Nos: 2009-05325, filed Mar. 4, 2009 and 2009-199467, filed Aug. 31, 2009 are expressly incorporated by reference herein.

What is claimed is:

1. A process for producing an optical article having an antireflection layer formed directly or via another layer on an optical base material, comprising:
   forming a primary layer contained in the antireflection layer; and
   forming a light transmissive conductive layer containing a compound of germanium and a transition metal on a surface of the primary layer.

2. The process for producing an optical article according to claim 1, wherein the formation of the conductive layer includes vapor of at least any one of germanium, a transition metal which forms the compound, and the compound on the surface of the primary layer.

3. The process for producing an optical article according to claim 1, wherein the primary layer is a layer containing a transition metal capable of forming the compound with germanium; and the formation of the conductive layer includes driving germanium into the surface of the primary layer.

4. The process for producing an optical article according to claim 1, wherein the antireflection layer is a multilayer film containing the primary layer; and the process further comprises forming another layer of the multilayer film by superimposing it on the conductive layer.

5. The process for producing an optical article according to claim 1, further comprising forming an antifouling layer directly or via another layer on the primary layer having the conductive layer formed on the surface thereof.

6. The process for producing an optical article according to claim 1, wherein the compound of germanium and the transition metal is germanide.

7. An optical article comprising:

an optical base material;

an antireflection layer formed directly or via another layer on the optical base material; and a light transmissive conductive layer which contains a compound of germanium and a transition metal and is formed on a surface of a primary layer contained in the antireflection layer.

8. The optical article according to claim 7, wherein the antireflection layer is a multilayer film, and the primary layer is one of the layers constituting the multilayer film.

9. The optical article according to claim 7, wherein the primary layer is a layer containing a transition metal capable of forming the compound with germanium.

10. The optical article according to claim 7, further comprising an antifouling layer formed directly or via another layer on the primary layer having the conductive layer formed on the surface thereof.

11. The optical article according to claim 7, wherein the optical base material is a plastic lens base material.

12. A pair of spectacles, comprising:

spectacle lenses; and a frame into which the spectacle lenses are fitted, wherein the spectacle lenses are the optical articles according to claim 11.

13. A system, comprising:

the optical article according to claim 7; and a device that projects and/or picks up an image through the optical article.

14. A system comprising:

the optical article according to claim 7; and a medium accessible through the optical article.

15. The optical article according to claim 7, wherein the compound of germanium and the transition metal is germanide.

* * * * *